(12) United States Patent
Beard, Jr. et al.

(10) Patent No.: US 8,149,983 B2
(45) Date of Patent: Apr. 3, 2012

(54) METHOD FOR ANALYSIS OF PELLET-CLADDING INTERACTION

(75) Inventors: Charles L. Beard, Jr., Murrysville, PA (US); Toshio Morita, Pittsburgh, PA (US); R. Wade Miller, Export, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 741 days.

(21) Appl. No.: 11/447,357

(22) Filed: Jun. 6, 2006

(65) Prior Publication Data

US 2007/0280401 A1    Dec. 6, 2007

(51) Int. Cl.
*G21C 9/00* (2006.01)

(52) U.S. Cl. ........................... 376/305; 376/277

(58) Field of Classification Search .............. None
See application file for complete search history.

(56) References Cited

U.S. PATENT DOCUMENTS

| | | | | |
|---|---|---|---|---|
| 4,080,250 | A | * | 3/1978 | Honekamp et al. ......... 376/251 |
| 4,368,170 | A | * | 1/1983 | Oguma et al. ............... 376/216 |
| 4,581,196 | A | * | 4/1986 | Sakagami et al. ........... 376/216 |
| 4,818,477 | A | | 4/1989 | Chubb |
| 5,331,679 | A | * | 7/1994 | Hirukawa .................... 376/439 |
| 6,345,081 | B1 | | 2/2002 | Sihver et al. |
| 2001/0036242 | A1 | * | 11/2001 | Hirukawa .................... 376/245 |
| 2002/0082796 | A1 | * | 6/2002 | Fang et al. ................... 702/120 |
| 2005/0021293 | A1 | * | 1/2005 | Elbel et al. .................. 702/183 |

OTHER PUBLICATIONS

Miles et al, "Statistical analysis and ground-based testing of the on-orbit Space Shuttle damage detection sensors", Laser Radar Technology and Applications X, Ed. Gary W. Kamerman, Proc. of SPIE, vol. 5791 (SPIE, Bellingham, WA 2005), pp. 238-249.*

Siu et al, "Bayesian parameter estimation in probabilistic risk assessment", Reliability Engineering and System Safety vol. 62, pp. 89-116 (1989).*

Ford et al., "Independent yields of the isomers of 133Xe and 135Xe for neutron-induced fission of 233U, 235U, 238U, 239Pu, and 242Am-m", Physical Review C 30(1), pp. 195-213 (The American Physical Society).*

Michael Billaux, "Modeling Pellet-Cladding Mechanical Interaction and Application to BWR Maneuvering" Proceedings of the 2004 International Meeting on LWR Fuel Performance, Orlando, Florida, Sep. 19-22, 2004, Paper 1047, pp. 1-9.

* cited by examiner

*Primary Examiner* — Rick Palabrica
*Assistant Examiner* — Marshall O'Connor

(57) ABSTRACT

A method is provided for evaluating pellet-cladding interaction (PCI) in a nuclear core having a reactor protection system and a plurality of elongated fuel rods each having fuel surrounded by cladding with a gap therebetween. The method includes: selecting a number of core parameters to be analyzed; evaluating the selected parameters at a plurality of statepoints; generating a model of an operating space of the core based, at least in part, upon the statepoints; selecting a subset or loci of statepoints from the model wherein each of the statepoints of the loci of statepoints, when subjected to a predetermined transient, falls within the operational limits of the reactor protection system; and evaluating the loci of statepoints for PCI in response to the transient. In this manner, the potential for PCI can be accurately determined without requiring every statepoint for every fuel rod in the core to be individually analyzed.

10 Claims, 3 Drawing Sheets

METHOD FOR ANALYSIS OF PELLET-CLADDING INTERACTION

BACKGROUND OF THE INVENTION

1. Field of the Invention

The present invention relates generally to the analysis of fuel failure in nuclear reactors and, more particularly, to a method of analyzing pellet-cladding interaction (PCI) in Condition II events.

2. Background Information

Commercial light water nuclear reactors (LWRs) generally include a plurality of cylindrical fuel elements which are grouped and secured together as separate fuel assemblies. The fuel assemblies are then arranged in an organized array to form the core of the nuclear reactor.

As shown in FIG. 1, each nuclear fuel element or rod 2 contains a stack of fuel pellets 4 (e.g., without limitation, uranium dioxide) enclosed within a zircaloy cladding 6 having a first end 8 and a second end 10. The first and second ends 8, 10 are capped by end plugs 12, 14, as shown. Typically, a hold-down spring 16 or other suitable restraining mechanism maintains the position of the fuel pellets 4 by biasing the pellets 4 toward the bottom or second end 10 of the fuel rod 2. A fission gas plenum 18 is disposed near the top or first end 8, and a relatively small or narrow gap 20 is present between the fuel pellets 4 and the cladding 6. When the fuel 4 is burned, it expands (i.e., swells) in both the axial and radial directions. Such expansion begins to reduce the gap 20 between the cladding 6 and the fuel 4. Eventually, if the fuel 4 is allowed to continue to expand, the gap 20 is totally eliminated (not shown). With different thermal expansion coefficients, increases in power can cause significant stress on the cladding 6. Once this stress exceeds a threshold, the cladding will rupture, an event commonly known as pellet clad interaction (PCI). PCI cladding failure is a breach of the first radioactivity boundary in the system, and results in the fuel pellets 4 and radioactive fission products being exposed to the reactor coolant. Such a condition is, therefore, extremely undesirable.

In an attempt to avoid cladding failure, the reactor protection system setpoints need to preclude operation that could result in PCI. The setpoints are validated using a detailed analysis of the normal operation (Condition I) and of events with moderate frequency (Condition II). More specifically, the analysis of Condition II events for fuel failure due to PCI is a regulatory requirement in some countries (e.g., without limitation, France). Condition II events include scenarios within the reactor core which are associated, for example, with an increase in nuclear reactivity and expressly include but are not limited to, boron dilution, rod withdrawal, and rod drop which is a condition in which one or more of the control rods unintentionally drop within the core.

Known methods of performing the PCI analysis are based upon a brute force approach that requires the review and analysis of many different operational histories and the initiation of different transients at multiple times within each history, followed by the evaluation of the impact of such transients on each and every fuel rod within the reactor core. In view of the fact that there can be up to about 50,000 or more fuel rods within the reactor core, it will be appreciated that such an approach is extremely labor intensive, time consuming, and costly. In some circumstances such rod-by-rod analysis can take up to about two years or more. Additionally, if the core or operational limits of the reactor change, the entire analysis must be redone.

There is a need, therefore, for a method of PCI analysis which is capable of accurately and efficiently evaluating and defining safe core operational guidelines in order to minimize the likelihood of PCI, without requiring a rod-by-rod brute force analysis.

There is, therefore, room for improvement in PCI analysis of nuclear reactors.

SUMMARY OF THE INVENTION

These needs and others are met by the present invention, which is directed to an improved method of analyzing pellet-cladding interaction (PCI) in Condition II events.

As one aspect of the invention, a method of evaluating pellet-cladding interaction in a nuclear reactor core is provided. The nuclear reactor core has a reactor protection system, and includes a plurality of elongated fuel rods. The fuel rods each include a cladding tube surrounding a plurality of nuclear fuel pellets with a gap being defined between the nuclear fuel pellets and the cladding tube. The reactor protection system defines a number of operational limits for a plurality of parameters of the core, with the operational limits being based, at least in part, upon a predetermined set of technical specifications for the core. The method comprises the steps of: selecting a number of the parameters of the core to be analyzed; evaluating the selected parameters at a plurality of statepoints, each of the statepoints corresponding to a predetermined point in time for a predetermined core condition, wherein a set of the statepoints defines a history point, the history point being representative of the operational history of one or more of the fuel rods of the core; generating a model of an operating space of the core based, at least in part, upon the statepoints; selecting a loci of statepoints from the statepoints of the model wherein each of the statepoints of the loci of statepoints, when subjected to a predetermined transient, falls within the operational limits of the reactor protection system, the loci of statepoints defining a subset of the statepoints within the operating space of the core, the selection of the loci of statepoints being based, at least in part, upon one or more the history point; and evaluating the loci of statepoints for pellet-cladding interaction in response to the transient.

The operating space may include those statepoints for which the reactor protection system would allow operation without forcing a shutdown of the reactor. The reactor protection system typically includes evaluation of parameters, such as, for example, total core power versus the axial flux difference (i.e., power in the top half minus power in the bottom half of the reactor core), inlet temperature, and primary system pressure. The analyzed operating space conservatively assumes the uncertainties in the measurement and, therefore, creates the largest possible operating space. It is the intent of the analysis to verify that the reactor is safe while within this possible operating space. The normal (i.e., Condition I) operating space is the space of allowable operation, as defined by the plant technical specifications. The technical specifications typically define limits which are monitored. Typical parameters which may be monitored include, for example and without limitation, the total core power, the core axial power distribution as defined by the core axial flux difference (i.e., power in the top half minus power in the bottom half of the reactor core), the control rod position, reactor vessel inlet temperature, and primary system pressure. The normal operating space is a subset of the possible operating space.

The transient to which the statepoints are subjected may be representative of a Condition II event. All Condition II statepoints must be able to be associated with an initiating statepoint that is within the normal operating space. The parameters which are selected may be selected from the group consisting of xenon distribution, control rod position, power level, time in life, and inlet temperature.

The method may further comprise: establishing a set of allowable core operating guidelines in order to provide for the safe operation of the core and to avoid pellet-cladding interaction; selecting a number of fuel rods of the core, the selected fuel rods having a controlling effect on the limits of the operating space; and evaluating the selected fuel rods for compliance with the guidelines. The xenon distribution in the core may be evaluated as a function of a delta xenon parameter and a xenon mid parameter, wherein the delta xenon parameter comprises the amount of xenon distributed in the top of the core minus the average amount of xenon in the bottom of the core, and wherein the xenon mid parameter comprises the average distribution of xenon in the middle third of the core minus the average xenon distribution of the entire core.

The operational limits of the reactor protection system may include normal core operating limits and Condition II transient limits, and the step of generating a model of the core operating space may further comprise: modeling the core operating space as a discrete grid comprising the plurality of statepoints, selecting as the loci of statepoints, points on the grid which have a controlling effect on the limits of the operating space, and evaluating the controlling points on the grid with respect to the normal core operating limits and with respect to the Condition II transient limits. Historical data (e.g., history points and parameters, as defined herein) regarding the parameters for a set of the fuel rods may be provided, and the evaluation of the safety parameters may compare the values at the statepoint condition with the historical data. The method may further comprise the step of accepting or rejecting the statepoint for safe operation of the core.

Accordingly, the method of the invention involves modeling and analyzing the reactor core using the discrete grid of the statepoints in order to accurately evaluate the fuel rods of the core for pellet-cladding interaction without requiring a multitude of core operational transients to be analyzed individually. The method may employ three-dimensional power distribution analysis to analyze the potential for pellet-cladding interaction in the fuel rods, and select steps of the method may be computer automated.

As another aspect of the invention, a method of analyzing fuel in a nuclear reactor core is provided. The nuclear reactor core has a reactor protection system which defines a number of operational limits for a plurality of parameters of the core. The method comprises: selecting a number of the parameters of the core to be analyzed; evaluating the selected parameters at a plurality of statepoints, each of the statepoints corresponding to a predetermined point in time for a predetermined core condition, wherein a set of the statepoints defines a history point, the history point being representative of the operational history of one or more of the fuel rods of the core; generating a grid of the statepoints in order to accurately model an operating space of the core; selecting a loci of statepoints from the statepoints of the model wherein each of the statepoints of the loci of statepoints, when subjected to a predetermined transient, falls within the operational limits of the reactor protection system, the loci of statepoints defining a subset of the statepoints within the operating space of the core, the selection of the loci of statepoints being based, at least in part, upon one or more the history point; and evaluating the loci of statepoints in response to the transient.

The loci of statepoints is a small subset of the total discrete grid and is uniquely determined by the initial point and each of the transients considered. The method may further comprise the steps of subjecting as the transient, a transient representative of a Condition II event; selecting as the loci of statepoints, statepoints associated with the Condition II event transient, the transient being initiated from each of the statepoints comprising the normal operating space of the core; analyzing the effect of the Condition II event on the selected parameters; and determining the potential for pellet-cladding interaction in response to the Condition II event.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
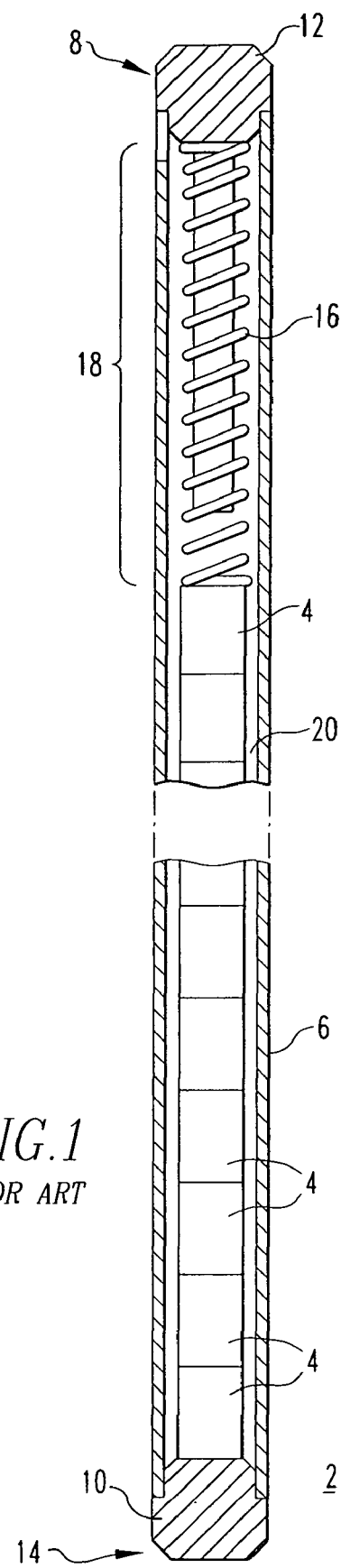
FIG. 1 is a cross-sectional, partially sectioned view of a fuel rod.

As employed herein, the phrase "normal operation" refers to operation of the nuclear reactor under standard operating conditions, commonly referred to as Condition I, wherein there is an absence of abnormal or unusual circumstances, such as, for example and without limitation, an accident event, a Condition II event, or any other abnormality having a significant impact on the operating parameters (e.g., without limitation, power distribution) of the reactor core. Normal operation is generally defined by limits on various key parameters as set forth in the plant technical specifications. Accordingly, the phrase "operating space" as employed herein, refers to the bounds of allowable, safe plant operation as dictated in part by the plant technical specifications for the particular nuclear plant at hand, and in part by the method of the invention. The operating space includes the range of core operation within which the reactor protection system will not be triggered so as to shut down the reactor.

As employed herein, the phrase "Condition II event" refers to scenarios or circumstances relating to a nuclear reactor core where an unanticipated change in nuclear reactivity is experienced, and may include actual events or simulations of the same (e.g., transients applied to the core to replicate a Condition II event). Condition II events expressly include, but are not limited to, soluble boron dilution, unintentional control rod withdrawal, inlet temperature cooldown and control rod drop, which is a condition in which one or more control rods are dropped unintentionally within the core. Some, but not all, Condition II events result in a trip of the reactor protection system, thereby shutting down the reactor.

As employed herein, the term "statepoint" refers to a particular point in time and/or a particular core operation (e.g., maneuver or transient). A set of statepoints corresponds to a "history point," wherein the history point, in accordance with the invention, reflects the previous operational history of the individual fuel rods in the reactor core. The history point parameters include local parameters for a multitude of fuel rods. The local parameters include, for example and without limitation, local burnup, base local power level, local isotopic concentrations of various nuclei, and an effective cold gap.

As employed herein, the phrase "loci of statepoints," refers to a subset or reduced number of statepoints selected from the total plurality of statepoints comprising the model (e.g., grid) of the core operating space. The selected statepoints of the loci of statepoints subset, when subjected to a predetermined transient (e.g., without limitation, a Condition II transient), fall within the operational limits of the plant reactor protection system.

As employed herein, the term "effective cold gap" refers to the magnitude of the gap or space between the fuel pellets and the fuel rod cladding at a nominal temperature with no power production by the fuel rod. In accordance with the present invention, effective cold gap data is tabulated (i.e., recorded) for a plurality of fuel rods at different history points throughout the life of the fuel, and is subsequently referenced as a key parameter in determining which fuel rods are acceptable for safe core operation. Thus, the effective cold gap of particular fuel rods serves as a history parameter for the generation of a history point, as defined herein.

Traditional Pellet-Cladding Interaction (PCI) Analysis

Pellet-cladding interaction (PCI) is a potential cause of fuel rod failure in light water reactors (LWRs). To prevent these failures, a variety of prior proposals for PCI have been implemented over the years. For example, more restrictive fuel preconditioning and maneuvering criteria have been developed to reduce the risk of PCI failure in fuel rods. Another prior proposal was the introduction of the concept of employing a zirconium liner fuel design. However, with the incorporation of the liner, utilities had a tendency to employ more aggressive operating strategies in an attempt to improve plant efficiency and, therefore override or surpass the new safety margins provided by the liner. A still further proposal was the implementation of smaller fuel with more rods in order to reduce the average fuel rod linear heat generation rate (LHGR) and provide greater margins to PCI failure. However, these margins were also commonly consumed by more aggressive core management which resulted in fuel being allowed to operate with higher local peaking factors. A more detailed history of PCI analysis, including a detailed discussion of modeling PCI in the reactor core, is provided, for example, in the published article, *Modeling Pellet-Cladding Mechanical Interaction and Application to BWR Maneuvering*, by Michel Billaux. That document is a publication of the company Framatome ANP, Inc. which has a place of business at 2101 Horn Rapids Road, Richland, Wash.

To combat the problem of cladding failure due to PCI, fuel vendors perform analyses to demonstrate that the protection system prevents PCI and, previously noted, in some countries the analysis of Condition II events for fuel failure due to PCI, is a regulatory requirement.

The traditional approach to performing such PCI analysis for Condition II events has been by way of the aforementioned brute force approach which involves looking at many different operational histories, the initiation of different transients at multiple different times within each of those histories, and finally evaluating the impact of such transients on each individual fuel rod (up to about 50,000 or more) within the reactor core. More specifically, conventionally a single statepoint is analyzed for a wide variety of power maneuvers (e.g., without limitation, percent reduction in power to a predetermined power level for a predetermined period of time; various rates of power reaction, including for example, ramp downs; and variations in the time duration for which the power is reduced (commonly referred to as the hold down time) and other plant operations under normal operating conditions, and data is recorded. This analysis, which in itself is laborious, is repeated for each of the 50,000 fuel rods. Making the analysis even more time-consuming and labor-intensive is the fact that numerous transients must be introduced at various statepoints within the maneuvers, in order to simulate the multiple possible Condition II events. Such transients are followed until their conclusion, for example, where a reactor protection system point (i.e., trip set point) is reached. The process is, therefore, highly multiplicative, as the foregoing analysis is repeated for each statepoint in the transient. Thus, all of the rods are analyzed in a brute force manner.

To assist in the foregoing analysis and to determine which of the fuel rods can be safely operated within the core, a known or suitable computer code is employed. Notwithstanding this fact, it is still an extremely labor and time-intensive process, often taking up to two man-years of effort or more.

As will now be discussed, the method of analysis of PCI of the invention is substantially different and provides a dramatic improvement.

3D FAC PCI Analysis in Accordance with the Invention

The method of the present invention employs a three-dimensional final acceptance criteria (3D FAC) methodology to analyze the potential for PCI failures and thereby provides an accurate, systematic and comprehensive, yet efficient analysis of the core as a model of select statepoints, as defined herein, as opposed to analyzing each and every statepoint in the core. In other words, the method of the invention minimizes redundancy and unnecessary inefficient duplicative analysis of substantially similar statepoints and/or for statepoints for which the associated parameters of the fuel are well known.

More specifically, the concept of 3D FAC in accordance with the invention, involves characterizing the core operating space by defining a discrete grid of statepoints characterized, for example, by the operational history, the reactor power, the control rod positions, the reactor inlet temperature and the xenon distribution which can be characterized using two or more summary parameters (e.g., without limitation, delta xenon and xenon mid, as defined hereinbelow). The evaluation of the power distribution statepoints is performed for several different times during the reload core operation in order to account for changes in the nuclear characteristics and fuel burn-up, which respectively affect the xenon distributions and the behavior of the core during the course of the transients. Xenon-135, as a direct fission by-product and also as a secondary by-product from the decay of iodine-135, is extremely parasitic to neutrons and, therefore, can adversely affect power distribution within the core as a function of time. This in turn can lead to significant local power changes which could possibly result in PCI.

Establishing safe core operational limits with respect to PCI, involves a similar but more complex analysis. Specifically, for PCI Condition II events, it is the power increase that is of primary concern. Therefore, as will be discussed herein, defining the limit or maximum allowable threshold, or failure threshold, within which the core may be operated safely while minimizing the potential of a PCI failure, requires the evaluation of, for example and without limitation, the local power change in the limiting fuel rods associated with the possible initial and final statepoints at a variety of different burn-ups, and for multiple power histories. A pair of initial and final statepoints will have the same history and xenon condition, but the statepoints could have different initial and final core powers, inlet temperatures and/or control rod insertions.

Normal core operation is not a single statepoint, rather it is an area or continuum that is a function of the core power. Typically, it has limits on the axial shape index (i.e., axial offset) and control rod insertion, both as a function of power, but it will be appreciated that other parameters can be defined in the technical specifications of the plant. Therefore, the evaluation of normal core operation involves the analysis of the core power distribution at a large spectrum of statepoints. The Condition II analysis then starts from each of the selected normal operation statepoints, and must evaluate the impact of the different transients on the fuel. As previously discussed, the traditional approach for this process is to model selected normal operation transients to generate the normal operation statepoints, and to then model the different Condition II transients from each of those statepoints in order to perform the Condition II analysis. However, it is difficult to generate transients that effectively cover the space of normal operation. Rather, a large number of duplicate or overlapping statepoints are frequently generated (see, for example, the overlapping data of FIG. 3). Recognizing these shortcomings, the method in accordance with the invention instead involves performing a direct combinatorial analysis using independent parameters, such as, for example, xenon distributions, control rod insertion, power level, and inlet temperature, in order to determine the core power distribution, and to evaluate the fuel with respect to the core protection limits. The limits include, for example, the maximum allowable core power as a function of the core axial offset or other suitable axial shape parameter and inlet temperature, or the maximum local power as a function of axial offset rod limits or other suitable axial shape parameter. Such limits are generated by evaluating multiple different fuel rods and then evaluating the maximum power that can be achieved before the limits are reached.

In this manner, the failure threshold is defined as the point where the technological limit for PCI is reached in the analysis. As employed herein, the "technological limit" is defined based upon analytical comparisons of, for example, historical data from power ramp tests with fuel failures, and then defining the limit which best characterizes the data. This limit will be defined as a continuous function over the extent of the evaluation. Then, the evaluation of Condition II transients may take into account the time aspect of the transient. Accordingly, multiple different limits may be created depending on the specific transient being evaluated. In this manner, the evaluation of the potential operational statepoints enables an evaluation of the ability to meet the limits for the various Condition II transients. Based upon this analysis, the allowable operational space, or operating bounds, can be defined. In other words, the method of PCI analysis of the invention focuses on defining the actual operational space, and on using the data in a manner which characterizes the actual limits. Thus, the method provides a process for efficiently performing an accurate PCI analysis of Condition II events without requiring the evaluation of multiple different normal operation transients, multiple different Condition II transients based upon the normal operation statepoints, or the individual evaluation of each separate fuel rod within the core. The speed and efficiency of performing PCI analysis is, therefore, drastically improved over the known approach. This will be still further appreciated and understood with reference to the comprehensive EXAMPLE provided and described hereinbelow.

More specifically, PCI analysis has traditionally involved taking, for example, three or four points in time in the cycle and going through a series of transients, such as, for example and without limitation, power reductions with various rod insertions, and then applying other transients (e.g., simulated Condition II events) at different points in time during the various transients. In other words, many variables were combined and compounded and modeled until operating limits were exceeded such that the reactor would shut down. Following the transients and Condition II events, conventional PCI analysis involved evaluating each individual fuel rod to perform a stress analysis as to the effect of the transient on the rod, and the likelihood of PCI to occur. A determination was then made as to whether or not each rod was suitable for safe operation in the core.

The method of PCI analysis of the invention improves the analysis by focusing on two key parameters in order to define xenon conditions at various points in time, and then generate a model of the core based upon this information. The model comprises, for example, a computer generated surface function with a grid representing the two key xenon parameters (e.g., delta xenon and xenon mid). In this manner, core statepoints with different xenon distributions may be modeled and analyzed rather than following specific xenon transients. Various points on the grid are then taken and analyzed, for example, as to control rod position and core power level. For instance, as will be appreciated with reference to the xenon distribution graph of FIG. 3, statepoints in two different transients may have substantially the same xenon distribution but for different reasons. Accordingly, rather than following specific transients and then analyzing each time point of the transient, xenon distribution, control rod position and power are evaluated over the entire spectrum of possible values. Since the expected changes to these parameters during the various Condition II transients are known based upon pre-existing accident and Condition II analysis historical data, the results of the foregoing analysis can be compared to the known reference values embodied in that data in order to clearly define or confirm existing core protection system setpoints or bounds, to ensure safe operation.

Figure 2:
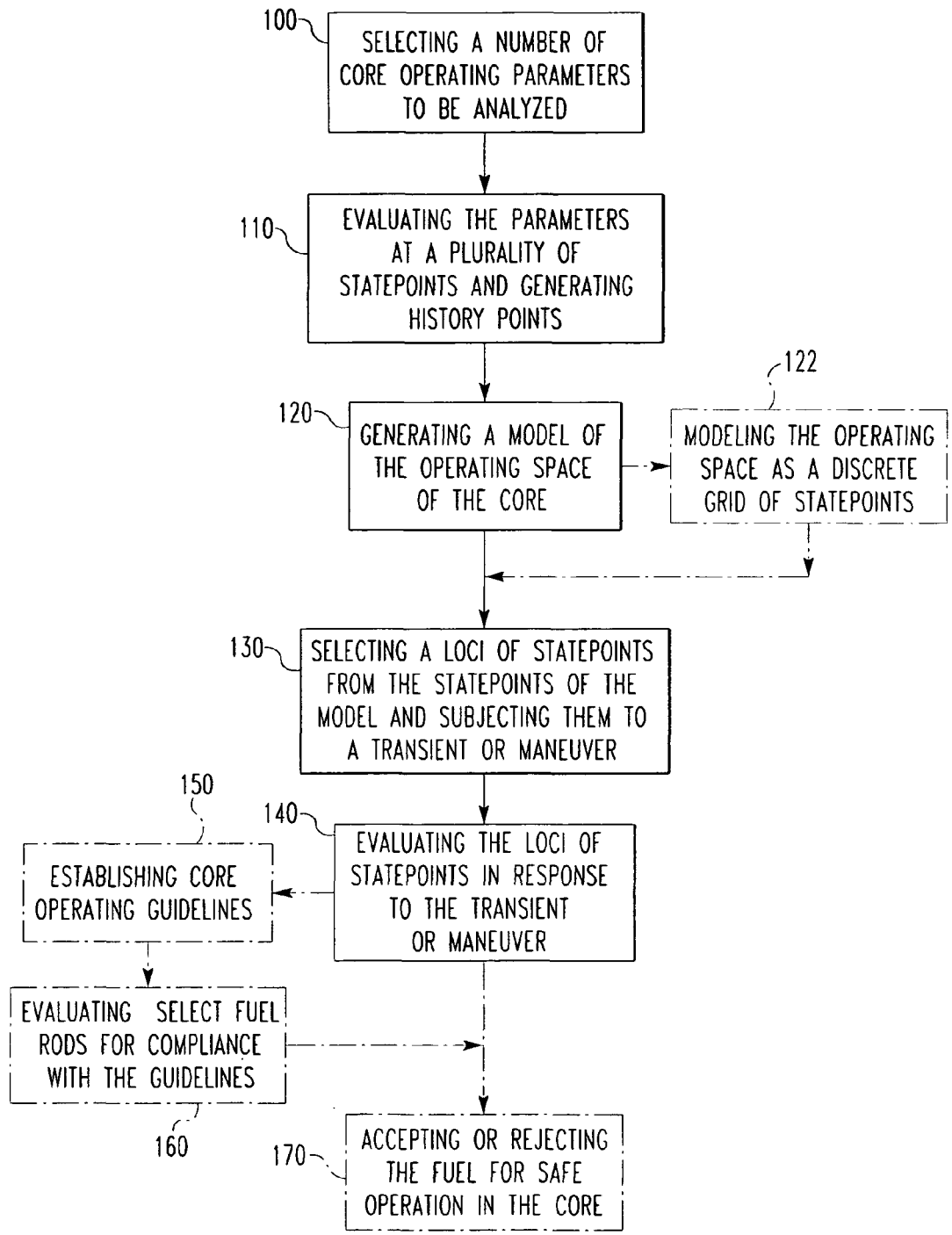
FIG. 2 is a flow chart showing the steps of a method of pellet-cladding interaction (PCI) analysis in accordance with the invention.

FIG. 2 shows a flow chart outlining the basic steps of the method of PCI analysis in accordance with the invention. Generally, the analysis begins with step 100 of selecting a number of core operating parameters to be analyzed, and step 110 of evaluating the parameters at a plurality of statepoints in order to generate multiple core histories (i.e., history points, as defined herein) for the operating cycle. A model of the operating space of the core is then generated in step 120, and a loci of statepoints is selected from the model and subjected to a transient or maneuver in step 130. Next, in step 140, the loci of statepoints is evaluated in response to the transient or maneuver. Core operating guidelines may then be established, and select fuel rods may be evaluated for compliance with the guidelines in steps 150 and 160, respectively. Finally, in step 170, the fuel is accepted or rejected for safe operation in the core.

Looking now at each of the aforementioned steps in greater detail, it will first be appreciated that each of the statepoints in the analysis corresponds to a predetermined point in time for a predetermined core condition, with a set of the statepoints defining a history point, and wherein the history points are representative of the operational history of one or more of the fuel rods. These core histories reflect different operational scenarios, such as, for example and without limitation, extended reduced power operation and extensive load follow operation in addition to extensive operation at full power. Thus, the analysis includes the generation of the history points and history parameters for the fuel rods of interest. One of the history parameters utilized may be effective cold gap. More specifically, over time, the Zircalloy cladding 6 (FIG. 1) surrounding the nuclear fuel pellets 4 creeps down, and the fuel pellets 4 swell. There are also different temperatures within the various regions of the fuel and different thermal expansion coefficients for the different parts. Thus, at different points in the life of the fuel and under different core conditions, the gap 20 or spacing between the cladding 6 and the fuel 4 is different. To provide a commonality for analysis purposes, an effective cold gap is defined, which is the gap 20 which would exist if the fuel rod was uniformly at a nominal cold temperature such as, for example, 20° C. Thus, effective cold gap is a key parameter for determining what the power limit is for a particular fuel rod, and ultimately which fuel rods are acceptable for safe operation in the core, in accordance with the invention.

Along with the generation of the core operating history, a PCI limit surface is created based upon the key history parameters. This PCI limit surface or grid will be utilized to evaluate multiple locations on a large set of fuel in order to determine if the fuel PCI limits, in accordance with the reactor protection system, are met. Thus, a map is provided which defines the maximum allowed power that would be permitted for a fuel rod node as a function of various key parameters (e.g., without limitation, effective cold gap).

Figure 3:
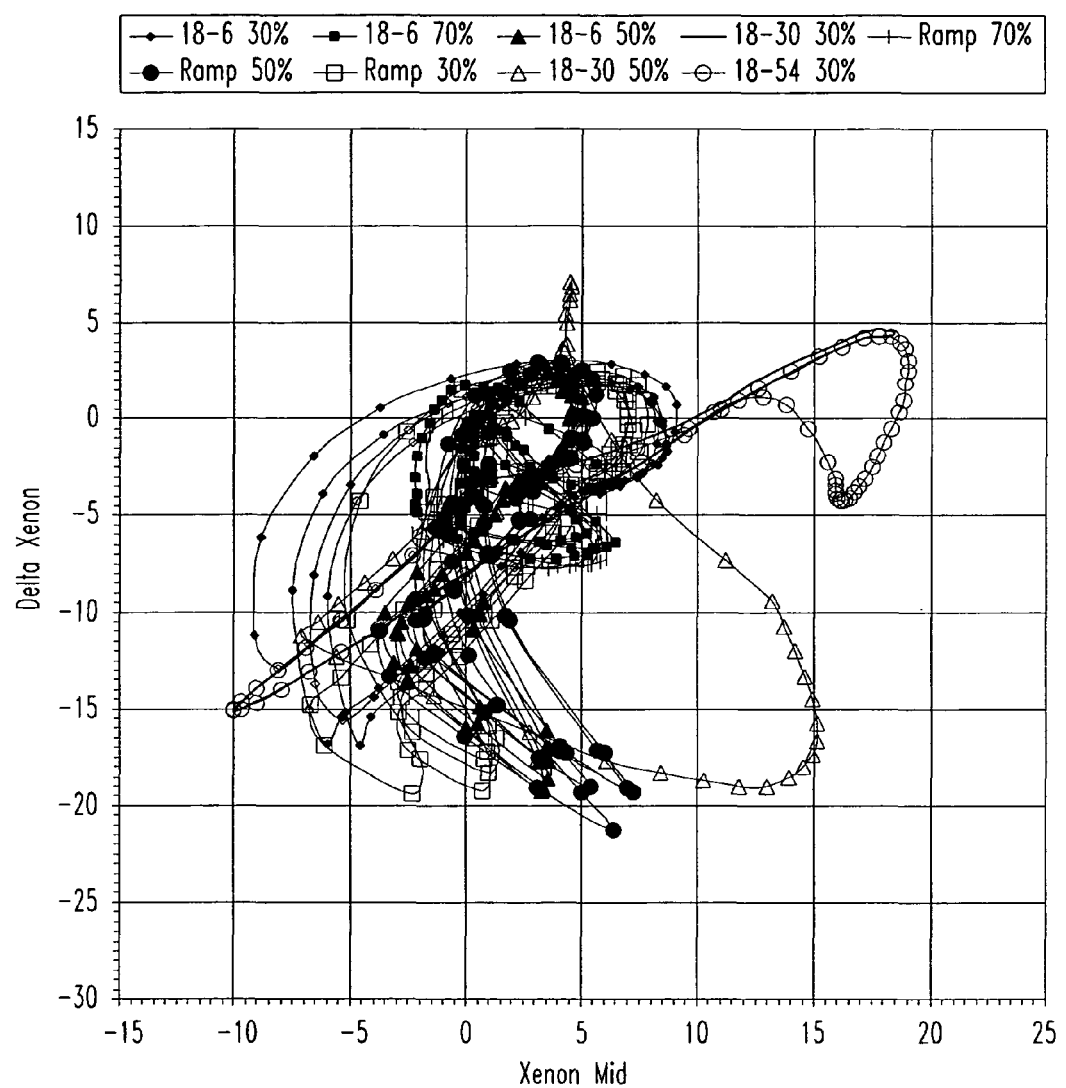
FIG. 3 is a graph showing a graphical representation of the impact of different transients on xenon parameters.

More specifically, step 110 involves selecting a number of the history points to be analyzed in detail. This selection will cover a range of times in the fuel cycle, and predetermined and selected potential core operating strategies. The key core parameters selected may include, for example and without limitation, core power level, control rod position for each controlling bank, and inlet temperature. The analysis also includes defining the range of xenon conditions and, in particular, the xenon distributions in the core, for each of the times in the fuel cycle. While the xenon distribution is a three-dimensional distribution throughout the reactor core, it can be characterized by two key parameters, delta xenon and xenon mid, as previously noted. The delta xenon, is the average amount of xenon distribution in the top of the core minus the average amount of xenon in the bottom of the core, and xenon mid, is the average amount of xenon in the middle third of the core (when the core is hypothetically divided into a top third, a bottom third, and a middle third) minus the average amount of xenon of the entire core. An example plot of delta xenon versus xenon mid for nine different transients for one point in the life of the fuel, the end of life (EOL) is shown in FIG. 3. By evaluating the xenon distribution, the range or bounds of the xenon parameters can be defined and the operating space of the core can be modeled. Thus, in step 110, the xenon conditions are selected which are to be used to model the operating space of the core in step 120. As shown in FIG. 2, this may be accomplished by way of step 122, generating a grid of statepoints to accurately represent the core operating space.

Then, in step 130, select statepoints on the grid are identified and analyzed. More specifically, a loci of statepoints is selected wherein the loci of statepoints comprises a reduced number or subset of select statepoints which have a controlling effect on the limits of the core operating space. In other words, certain statepoints and, for that matter, certain fuel rods within the core, have a tendency to define the bounds (i.e., the margin to the reactor protection system limit) within which the reactor core may be safely operated without exceeding the limits (i.e., initiating a trip) of the reactor protection system. The determination of which statepoints are controlling or limiting can generally be made from a review of the operational histories of the fuel rods. In summary, the loci of statepoints generally comprises the subset of statepoints which, when subjected to a predetermined transient (e.g., without limitation, a predetermined Condition II transient), will not exceed the limits of the reactor protections system.

In step 140, the loci of statepoints is evaluated in response to the transient. For example, the loci of statepoints which have been subjected to a Condition II transient are evaluated for pellet-cladding interaction. In this manner, representative statepoints can be analyzed as opposed to analyzing each and every statepoint associated with many different core transients. More specifically, as previously noted, and as will be appreciated with reference to the xenon distribution plot of FIG. 3, there are a large number of duplicative or redundant statepoints for the various transients. Recognizing this, the method of the invention involves selecting only certain controlling statepoints while continuing to accurately represent the entire range or bounds of the data which defines the core operating space. Thus, in the example of FIG. 3, the xenon statepoints are chosen to bound the xenon distributions which are generated in representative power transient evaluations.

Analyzing the selected statepoints of the model generally involves checking effects on the power distribution. Specifically, in accordance with the invention, the selected statepoints are systematically analyzed, rather than actually running a plethora of transients at each statepoint in accordance with known PCI analysis methods. While this still produces a large number of cases (e.g., the number of power histories, times the number of points in the cycle, times the number of core power levels, times the number of different control rod locations, times the number of different xenon distributions, time the number of inlet temperatures, times any other suitable variations), this analysis can be performed very systematically, with each of these statepoints being evaluated to see if the fuel rods are acceptable within the designated safety criteria for the nuclear plant. More specifically, as shown in FIG. 2, in a step 150, core operating guidelines can be established in accordance with designated safety criteria for the nuclear plant to ensure safe operation of the fuel in the core, without pellet-cladding interaction. Then, in step 160, select fuel rods can be evaluated for compliance with such guidelines. The guidelines include safety criteria, such as, for example and without limitation, peak power within the rod, departure from nucleate boiling and various fuel rod criteria, such as, for example, the evaluation of margin to PCI. The evaluation of the fuel rods against their criteria involves the analysis of many, if not all, of the fuel rods within the nuclear reactor since they have different power histories and different local powers. Thus, in accordance with the invention, the most limiting or controlling fuel rod at each statepoint is used to define the margin to the limit.

It will be understood that although the analysis in steps 140, 150 and 160 may indeed find statepoints which exceed the limits, those statepoints should be excluded by the core limits and protection system. Accordingly, a primary purpose of the analysis is to demonstrate that the core limits and protection are adequate to protect against fuel failure (e.g., without limitation, due to PCI). Thus, in steps 160 and 170 those statepoints which are within the normal operation limits, as defined by the plant technical specifications, are selected. Typical parameters which define normal operation include, for example and without limitation, the allowable region for the control rod insertion, the maximum allowable power and the allowable axial flux difference as a function of the core power level. It will, however, be appreciated that depending on the plant technical specifications, other parameters can be used to select the allowable Condition I statepoints. These normal operation statepoints then serve as initiator points for the various hypothetical Condition II transients, as previously discussed.

In summary, the analysis involves selecting the resulting statepoints permitted by Condition II transients (e.g., without limitation, dropped rod; rod withdrawal; inlet temperature cooldown; soluble boron dilution) which were initiated from acceptable Condition I (i.e., normal operation) statepoints. The set of possible Condition II statepoints is then evaluated to determine if the predetermined criteria for preventing fuel failure (i.e., fuel integrity criteria) are met. The purpose of this analysis is to verify that the possible Condition II statepoints which do not meet the fuel integrity criteria, are not permitted by the reactor protection system. Thus, all normal operation and Condition II transients will not exceed the fuel failure limits. Data for the loci of statepoints, after, or in response to, the transient is compared to limits based upon historical data (i.e., history points and parameters, as defined herein), and the fuel rod is accepted or rejected for safe operation (e.g., avoidance of PCI) in the core. It will, therefore, be appreciated that steps 130 through 170 of the method can involve the application of any known or suitable plant maneuver or transient.

Accordingly, the invention involves analyzing the core as an area or continuum by monitoring the change in power from one selected statepoint to another, rather than the conventional point-by-point or rod-by-rod approach which requires isolation of each rod and monitoring local change in power and effects thereof to see if acceptable PCI criteria are exceeded for that rod, and then repeating the entire process for all 50,000 rods. Therefore, the method of the invention not only accurately evaluates the full scope of the core operating space, but it also simultaneously greatly simplifies the analysis by significantly reducing (i.e., by several orders of magnitude) the overall number of statepoints which are selected, modeled, and analyzed, and still further drastically simplifies the analysis by avoiding numerous unnecessary or redundant transient analyses for each of the statepoints of the model. Thus, it will be appreciated that the invention provides a method which is generally as precise and accurate as traditional PCI analyses methods, if not more so, but also vastly reduces the labor, time and thus cost of the analysis.

It will also be appreciated that the analysis in accordance with the invention is, of course, largely facilitated by the use of a suitable computer code. Specifically, the aforementioned model is generated in the code as a surface map or grid function representative of the core operating area and based, at least in part, upon the fuel rod histories (e.g., history points and parameters, previously discussed and defined herein) as a function of the aforementioned key rod parameters (e.g., without limitation, effective cold cap, local burnup and local power). At least steps 140 and 160 of the method can then be performed using the code to analyze the fuel rods to determine, for example, the maximum power change that can be handled before a particular rod will suffer from PCI. The method, or at least select steps thereof are, therefore, computer automated. In this manner, the 3D FAC, which is required by some plant operators, can be accurately, effectively, and efficiently accomplished while vastly reducing the amount of analysis required.

The method of the invention will be still further understood with reference to the following EXAMPLE which is provided solely for the purpose of simplicity of illustration, and is not meant to be limiting upon the scope of the invention. Specifically, the EXAMPLE provides a comparison of the PCI analysis of a Condition II event in accordance with the known method of analysis described hereinbefore, as compared to the improved method of the invention.

EXAMPLE

For the comparison, the same plant operating period (e.g., cycle), the same number of operational histories, and the same number of times within the operating period, are analyzed under both methods. Specifically, in both methods, about 2-3 operational histories were each analyzed at about 3-4 different times within the period. The two methods of analysis then diverge significantly, as will now be discussed.

For the traditional approach, in addition to the foregoing steps, each of the 3-6 operational histories was then analyzed for between about 12-32 different normal operating maneuvers, and each maneuver was analyzed for about 30-60 time steps. This was followed by the application and analysis of about 4-8 Condition II transients starting at each normal operation statepoint. Each Condition II transient starting at a normal operation statepoint had to also be analyzed for about 10-150 time steps. The power history versus time for each of the foregoing steps was applied for each fuel rod in the computer code model. In other words, all of the foregoing steps, which are quite numerous and cumbersome, must be performed about 13,000 or more times. Finally, an evaluation of the fuel rod performance had to be done using a fuel rod analysis code that contains fuel rod stress analysis capabilities. In summary, the traditional approach involves a multiplicative combinatorial problem wherein each step has multiple options to consider and analyze. In all, between about 1 billion and about 72 billion cases must be analyzed.

The method of the invention on the other hand, vastly reduced and simplified the analysis. Specifically, in the instant EXAMPLE, the nuclear core operating space model was determined as a function of the aforementioned selected parameters for different power levels about 5-7 times. Xenon distributions were evaluated about 25-40 times, and different control rod insertions were evaluated about 18-64 times. These analyses were performed with the Westinghouse Electric Company ANC code, which is a three-dimensional nuclear analysis code licensable from the Westinghouse Electric Company LLC having a place of business in Monroeville, Pa. It will, however be appreciated that any known or suitable alternative three-dimensional nuclear analysis code could be employed.

Typical fuel rods were modeled and evaluated for multiple idealized operational profiles and characteristic history parameters and a limiting power surface were generated. The characteristic history parameters and the limiting power surface are functions of key fuel parameters (e.g., the local fuel burnup, and the effective cold gap). This model was then utilized in the nuclear analysis tool to create the history information for the selected fuel rods to be analyzed and to determine the acceptability of the local power transient with respect to PCI failure. The foregoing was done for each of the limiting or controlling fuel rods in the model, about 10-100 total times. Like the prior art approach, a combinational problem was generated and solved using the suitable computer code. However, the extent of the analysis was dramatically simplified. Specifically, in comparison with the aforementioned traditional approach which required a total of between about 1 billion and 72 billion cases to be analyzed, the analysis of the invention reduced this number tremendously to between about 135,000 to about 21.5 million cases.

Accordingly, it will be appreciated that the method of the invention drastically reduces the duration of the analysis, as previously discussed, from about two years to a number of weeks. In addition, the discretation of the key core statepoint parameters allows the analysis to be performed automatically by the computer code, which eliminates much of the elapsed time traditionally required for the analysis.

Referring again to FIG. 3, the method of the invention will be still further understood and appreciated. FIG. 3 shows a plot of Delta Xenon versus Xenon Mid, as previously defined herein, for nine different transients. Thus, the resultant plot of FIG. 3 illustrates the end of life (EOL) load swings resulting from the various transients. The transients include three ramp maneuvers wherein core power is slowly reduced or ramped down to a determined level (e.g., 30%, 50% and 70%) and then ramped slowly back up, and six other transients. By way of example, the 18-6, 30% transient noted in the legend of FIG. 3 refers to a transient wherein the core is operated for 18 hours at full power followed by a rapid decrease to 30% power for six hours. It will, however, be appreciated that any suitable transients and maneuvers other than those shown in FIG. 3 could be applied and analyzed without departing from the scope of the invention. The plot shows the Delta Xenon versus Xenon Mid for all of the statepoints for each of the transients. As shown, and as previously described, there is significant overlap, or close relationship and redundancy between many of the statepoints for the different transients. As noted, the method of the invention acknowledges this redundancy and utilizes it in order to efficiently and accurately model and analyze the core.

In view of the foregoing, it will be appreciated that rather than applying the straight linear approach of the known PCI analyses, the method of the invention is substantially different, instead involving the modeling of core transients as a grid of selective statepoints of the core operating space combined with the historical data, and then analyzing the transients as a progression between different statepoints on the grid (i.e., combination of the various key parameters) or model to evaluate the impact of, for example, a particular Condition II event on PCI. It is in this manner that the PCI analysis, which would have taken up to about 2 man-years worth of labor, or more, using conventional brute force methods of analysis, can be accomplished using the combinatorial approach of the invention, in as little as three weeks or less.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of evaluating pellet-cladding interaction in a core of a nuclear reactor, said nuclear reactor core having a reactor protection system, and including a plurality of elongated fuel rods, said fuel rods each including a cladding tube surrounding a plurality of nuclear fuel pellets with a gap being defined between said nuclear fuel pellets and said cladding tube, said reactor protection system defining a number of operational limits for a plurality of parameters of said core, said operational limits being based, at least in part, upon a predetermined set of technical specifications for said core, said method comprising the steps of:
selecting a number of said parameters of said core to be analyzed, including xenon-135 distribution in said core;
evaluating the selected parameters at a plurality of statepoints, each of said statepoints corresponding to a predetermined point in time for a predetermined core condition, wherein a set of said statepoints defines a history point, said history point being representative of the operational history of one or more of said fuel rods of said core;
generating a model of an operating space of said core based, at least in part, upon said statepoints and plotting said model of said operating space on a display;
selecting a loci of statepoints from said statepoints of said model and subjecting said loci of statepoints to a predetermined simulated transient, wherein each of said statepoints of said loci of statepoints falls within the operational limits of said reactor protection system, said loci of statepoints defining a subset of said statepoints within said operating space of said core, the selection of said loci of statepoints being based, at least in part, upon one or more said history point;
evaluating said loci of statepoints for pellet-cladding interaction in response to said simulated transient, prior to operation of said nuclear reactor;
if pellet-cladding interaction is predicted, then rearranging said fuel rods or adjusting the operational limits of said reactor protection system; and
if pellet-cladding interaction is not predicted, then accepting the arrangement of said fuel rods for safe operation in said core.

2. The method of claim 1 further comprising subjecting as said transient, a transient which is representative of a Condition II event.

3. The method of claim 1 further comprising selecting as said parameters, at least one parameter selected from the group consisting of time-in-cycle, xenon distribution, control rod position, and power level.

4. The method of claim 3 further comprising:
establishing a set of allowable core operating guidelines in order to provide for the safe operation of said core and to avoid pellet-cladding interaction,
selecting a number of fuel rods of said core, the selected fuel rods having a controlling effect on the limits of said operating space, and
evaluating the selected fuel rods for compliance with said guidelines.

5. The method of claim 3 further comprising:
evaluating the xenon distribution in said core as a function of a delta xenon parameter and a xenon mid parameter,
wherein the delta xenon parameter comprises the amount of xenon distributed in the top of said core minus the average amount of xenon in the bottom of said core, and
wherein the xenon mid parameter comprises the average distribution of xenon in the middle third of said core over the average xenon distribution of the entire core.

6. The method of claim 1 wherein each said history point comprises at least one history parameter selected from the group consisting of local burnup, local power level, local isotopic concentrations of select nuclei, local effective cold gap, and maximum allowed power; and wherein said at least one history parameter is evaluated for at least one power history for each of said fuel rods, in order to create historical data for each of said fuel rods within said core.

7. The method of claim 6 further comprising:
providing a nuclear analysis code,
incorporating said historical data into said nuclear analysis code, and
employing said nuclear analysis code to evaluate said core over a fuel cycle under a number of different core operating scenarios, said core operating scenarios being selected from the group consisting of base load operation at 100% power, operation at reduced power, and load follow operation wherein the core power level changes frequently.

8. The method of claim 7 further comprising:
comparing the evaluation of said loci of statepoints to said historical data, and
accepting or rejecting said fuel rods for safe operation in said core.

9. The method of claim 1 further comprising employing three-dimensional nuclear core power distribution analysis in order to analyze the potential for pellet-cladding interaction in said fuel rods.

10. The method of claim 1 further comprising:
providing as said statepoints, statepoints associated with normal operation of said core, and statepoints associated with said Condition II event, and
modeling and analyzing said fuel rods of said core using a reduced number of said normal operation statepoints and said Condition II statepoints in order to accurately evaluate said fuel rods of said core for pellet-cladding interaction without requiring all of said statepoints for all of said fuel rods of said core to be analyzed individually.

* * * * *